(12) United States Patent
Madan et al.

(10) Patent No.: US 10,733,142 B1
(45) Date of Patent: Aug. 4, 2020

(54) METHOD AND APPARATUS TO HAVE SNAPSHOTS FOR THE FILES IN A TIER IN A DE-DUPLICATION FILE SYSTEM

(71) Applicant: EMC IP Holding Company LLC, Hopkinton, MA (US)

(72) Inventors: Nitin Madan, Gurugram (IN); George Mathew, Belmont, CA (US); Srikant Viswanathan, Pune (IN); Kalyan C. Gunda, Bangalore (IN); Chetan Risbud, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 209 days.

(21) Appl. No.: 15/721,859

(22) Filed: Sep. 30, 2017

(51) Int. Cl.
*G06F 16/00* (2019.01)
*G06F 16/11* (2019.01)
*G06F 11/14* (2006.01)
*G06F 3/06* (2006.01)
*G06F 16/185* (2019.01)
*G06F 16/17* (2019.01)

(52) U.S. Cl.
CPC .......... *G06F 16/128* (2019.01); *G06F 3/0655* (2013.01); *G06F 11/1448* (2013.01); *G06F 16/185* (2019.01); *G06F 3/065* (2013.01); *G06F 3/067* (2013.01); *G06F 16/1727* (2019.01)

(58) Field of Classification Search
CPC .................................................. G06F 16/128
USPC .......................................................... 707/639
See application file for complete search history.

(56) References Cited

U.S. PATENT DOCUMENTS

| | | | |
|---|---|---|---|
| 6,895,586 B1* | 5/2005 | Brasher ................ | G06F 9/465 709/201 |
| 2009/0070382 A1* | 3/2009 | Agrawal ............... | G06F 16/16 |
| 2009/0077097 A1* | 3/2009 | Lacapra .............. | G06F 16/119 |
| 2009/0204650 A1* | 8/2009 | Wong ................ | G06F 16/1744 |
| 2012/0198049 A1* | 8/2012 | Sangra ............... | G06F 11/3433 709/224 |

* cited by examiner

*Primary Examiner* — Chelcie L Daye
(74) *Attorney, Agent, or Firm* — Womble Bond Dickinson (US) LLP (57) ABSTRACT

Embodiments are described for performing a storage tier-specific file system operation in a file system that comprises a namespace that spans multiple tiers of storage. A file system command can be a tier-specific deletion of files in a multi-tier file system, or a move data operation from a first tier of storage to a second tier of storage, affecting both the first and second tier of storage. The file system command can generate a copy of the namespace for the first tier of storage and a snapshot of the data of the first tier of storage referenced in the file system operation. Functionality may be performed using one or more storage appliances, each of which can have its open processing system, memory and storage device(s). Storage tiers can include active tier, cloud tier, and remote or archive storage tier.

18 Claims, 7 Drawing Sheets

METHOD AND APPARATUS TO HAVE SNAPSHOTS FOR THE FILES IN A TIER IN A DE-DUPLICATION FILE SYSTEM

TECHNICAL FIELD

This disclosure relates to the field of taking snapshots as a precursor to performing a file system operation in a system comprising multiple tiers of storage.

BACKGROUND

A storage appliance can manage storage and replication of data to multiple tiers of storage. Tiers of storage can include an active tier, a cloud tier, a remote tier, an archive tier, and other tiers of storage. The multiple tiers of storage, collectively termed a storage system, can have a single namespace for accessing files on the multiple tiers. The namespace may be stored in a tree structure, such as a b-tree. A storage appliance can store and manage a large plurality of namespaces, each stored as, e.g., a b-tree, and linked together in a single data structure for the large plurality of namespaces. To expose a namespace of a multi-tier storage system to one or more users, the namespace of the storage system may stored on an active tier of storage, such as a storage appliance. A storage appliance may perform various storage system operations that are directed to one tier of the storage system, utilizing the namespace that references the multiple tiers of the storage system. Storage system operations may include replication of files or data from one tier to another, renaming or deleting of files, and other file system operations. As a prerequisite to a storage appliance operation, a snapshot of the namespace and data space of the storage may be needed.

One of the problems with performing tier-specific snapshots in a multi-tier storage environment using a single namespace that references the multiple tiers, is that the storage space in multiple tiers of the storage system is locked out. Customers may want to have the ability to take a snapshot only in a particular tier. In the prior art, taking a snapshot of a particular tier in a mutli-tier storage system can lock files across multiple tiers to perform a multi-tier file system operation, in part because the namespace of the multi-tier storage system spans the multiple tiers.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for performing a file system operation on a specific tier of storage in a multi-tier storage system. The file system operation results in a snapshot being taken of data on a first tier, and the file system operation affects multiple tiers of the multi-tier storage system. For example, a file system operation to move files from a first tier of storage to a second tier of storage results in a snapshot of the file data being taken on the first tier of storage, and moving the file data to the second tier of storage. To perform the file system operation on a specific tier of storage, a copy of the namespace for the tier is generated from a namespace that spans all tiers of the multi-tier storage system. Also, a snapshot copy of the data of the tier is generated that contains only nodes corresponding to the files of the tier implicated by the file system operation on the tier. The tier-specific copy of the namespace and tier-specific snapshot of the files is taken without locking up the space in the active tier of storage. A storage device can have a namespace that spans multiple storage tiers. In an embodiment, the storage device can comprise an active storage tier. The storage device can receive a request to perform a tier-specific file system operation. A tier-specific file system operation can include a file system moving files from one storage tier to another, backing up files from a first storage tier to a second storage tier, deleting or renaming files, determining status of disk quota usage, or other file system operation. In response to receiving a request for a tier-specific file system operation, the storage device can generate a tier-specific namespace that corresponds to the tier-specific file system operation. Using the tier-specific namespace, the storage device can generate a tier-specific snapshot of data associated with the tier-specific namespace, and execute the tier-specific file system operation. In an embodiment, a storage tier can include an active storage tier, cloud storage tier, remote storage tier (such as for disaster recovery), or a long term (or "archive") storage tier. A storage device can include a storage service, a storage appliance, a network attached storage, or other storage device. In an embodiment, the tier-specific file system operation specifies a storage tier other than the active storage tier. In an embodiment, prior to performing the tier-specific file system operation, the storage device can lock at least portion of the namespace that spans multiple tiers. In an embodiment, the locked portion corresponds to the storage tier specified in the tier-specific file system operation. To generate a tier-specific namespace from the multi-tier namespace, the storage device can traverse the multi-tier namespace and identify namespace entries that are associated with the specified tier in the tier-specific file system operation. The storage device can use the tier-specific namespace to identify file system data associated with the tier-specific namespace entries and generate a snapshot of data that the tier-specific operation will act upon.

Any of the above methods can be embodied on a non-transitory computer-readable medium programmed with executable instructions that, when executed, perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
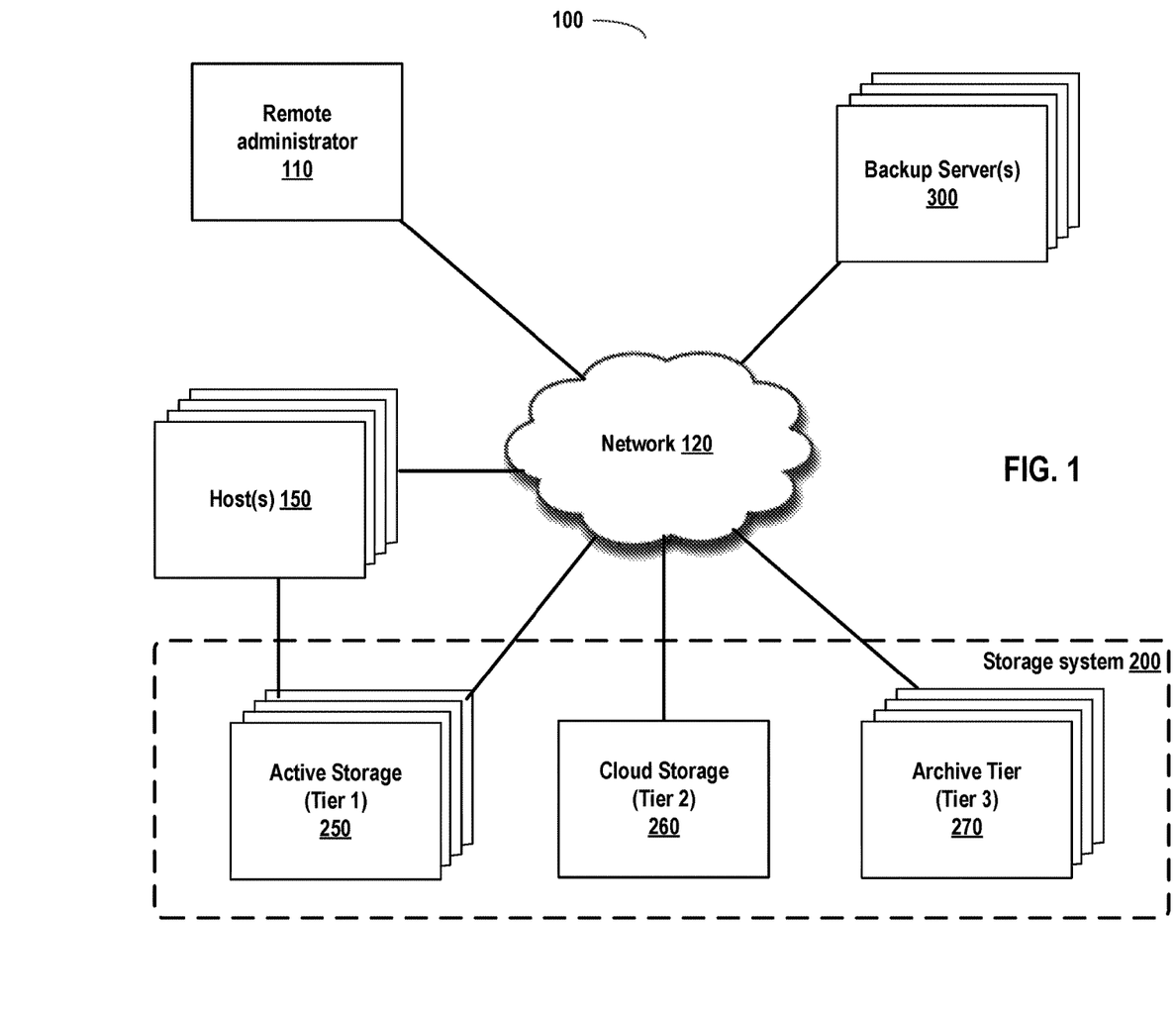
FIG. 1 illustrates, in block diagram form, an overview of a computing infrastructure that can snapshot files of a specific tier of a multi-tier storage system, in accordance with some embodiments.

FIG. 1 illustrates, in block diagram form, an overview of a computing infrastructure 100 that can perform a tier-specific file system operation in a multi-tier storage system 200, in accordance with some embodiments. The file system operation results in a snapshot being taken of data on a first tier, and the file system operation affects multiple tiers of the multi-tier storage system, such as by moving file from a first tier of storage to a second tier of storage.

A multi-tier storage system 200 (or, just "storage system") can include an active storage tier 250 (e.g., Tier 1), a cloud storage tier 260 (e.g., Tier 2), an archive storage tier 270 (e.g., Tier 3), or other storage tier. One or more of active storage 250, cloud storage 260, or archive storage 270 can include a multi-tier namespace of a file system, containing entries that reference files and/or directories stored across the multiple tiers of storage system 200. In an embodiment, the active storage tier 250 can include the multi-tier storage 200 namespace. The multi-tier storage 200 namespace can comprise filenames of, e.g., a single user's files, across all tiers of storage for the single user. In an embodiment, the multi-tier name space can represent a storage system 200 namespace for a business entity, and the multi-tier storage 200 namespace can include filenames and directories of the business entity across multiple tiers of storage system 200. In an embodiment, the various storage tiers of storage system 200 can be interconnected via a network 120.

Network 120 may be any type of network such as a local area network (LAN), a wide area network (WAN) such as the Internet, a fiber network, a storage network, or a combination thereof, wired or wireless. Active storage tier 250 can include a large plurality of namespaces for a large plurality of hosts 200. Each of the large plurality of namespaces can span multiple tiers of storage in the storage system 200. Each namespace of active storage tier 250 can be linked under an umbrella tree (u-tree). In an embodiment, there can be plurality of u-trees on active storage 250, each having a plurality of namespace trees under it, each namespace tree storing one or more namespaces that each span the multiple tiers of storage system 200.

Host(s) 150 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host(s) 200 may be an active storage (e.g., local data center) that provides storage to other local clients, which may periodically back up the content stored therein to a backup storage system (e.g., a disaster recovery site or system), such as backup system 300 or other storage tier.

Host 150 can store, delete, rename, move, or access files in any other of the tiers of storage system 200. In an embodiment, a virtual machine on a host 150 can include one or more virtual disks that map to one or more physical disk drives of a storage tier in storage system 200. In an embodiment, the one or more physical disk drives can be located within active storage 250. In an embodiment, active storage 250 can comprise a storage appliance 250, such as a network attached storage (NAS) appliance 250. A storage appliance 250 can include a large number of disks, such as EMC® VMAX 400K with up to 5,760 hard drives. In an embodiment, a storage appliance 250 can comprise a deduplication storage system, such as EMC® Data Domain storage systems, having a storage capacity of over 100 petabytes (PB). In an embodiment, one or more storage appliances 250 can form a part of a host 150 as an active storage 250. In an embodiment, a virtual disk can be a raw virtual disk mapped to a one or more portions of storage. A portion of storage can comprise one or more logical unit numbers (LUNs) of a single physical disk or one or more physical disks in a storage appliance 250. In an embodiment, a raw disk can be configured to use virtual mapping to one or portions of storage, such that the portions of storage can be snapshot before a backup. In an embodiment, a raw virtual disk can be physically mapped to one or more portions of storage.

A tier-specific file system operation can be initiated by a user of a virtual machine on host 200 or a physical machine 200. In an embodiment, a remote administrator 110 can issue a tier-specific file system operation, e.g. on behalf of a user of a host 150. A representative computing device for a remote administrator can be a computing system as described below with reference to FIG. 7.

Backup server(s) 300 can be used to facilitate backup, deduplication, movement of files from a first tier to a second tier, or other file system 200 for the multiple tiers of storage in file system 200. Backup server(s) 300 can be any type of computing platform including a cluster of servers, servers interconnected via a network 120, a single server, or other computing platform. A representative computing device for a backup server can be a computing system as described below with reference to FIG. 7.

Figure 2:
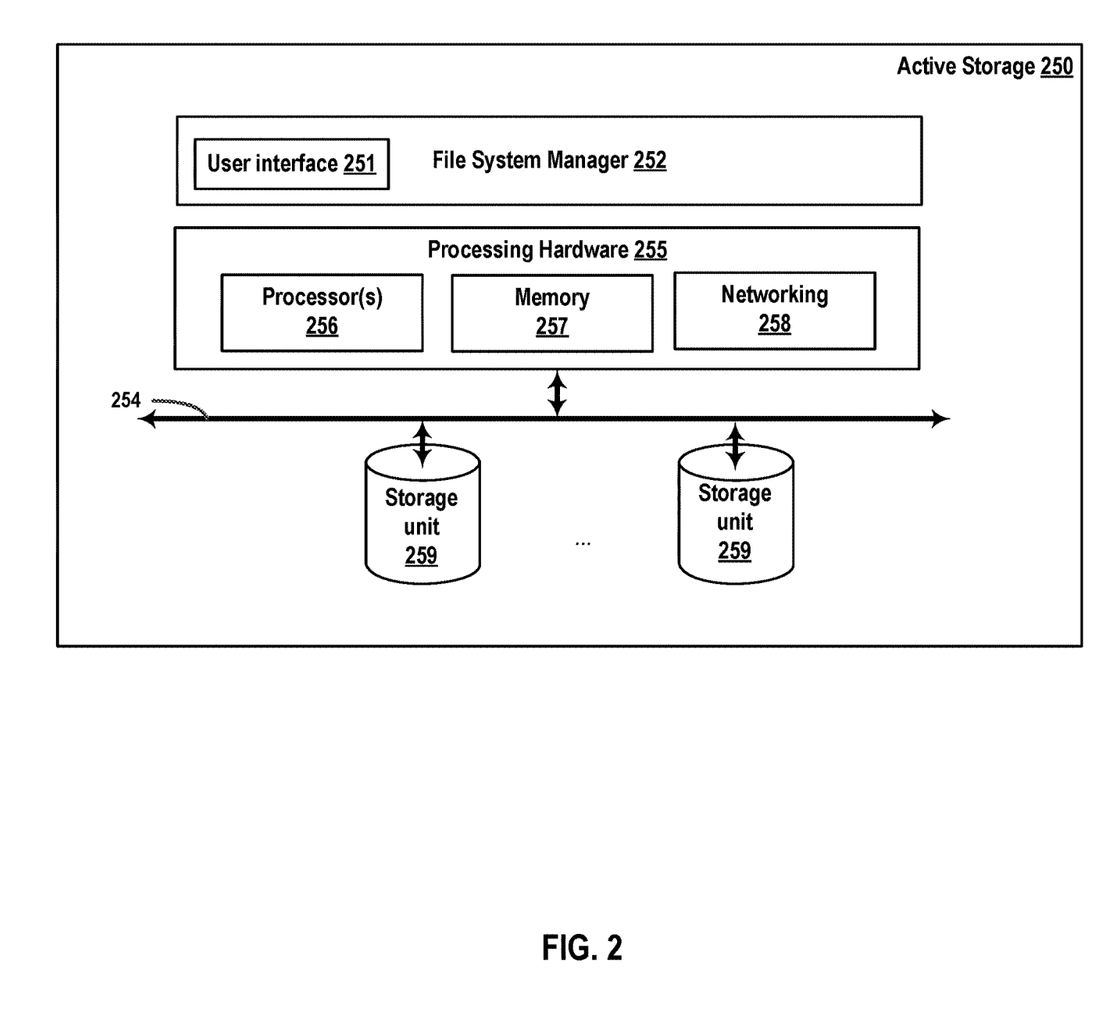
FIG. 2 illustrates, in block diagram form, components of a storage system that can snapshot files of a specific tier of a multi-tier storage system, in accordance with some embodiments.

FIG. 2 illustrates, in block diagram form, components of an active storage 250 that can perform a tier-specific file system operation in a multi-tier storage system 200, in accordance with some embodiments. The file system operation results in a snapshot being taken of data on a first tier, and the file system operation affects multiple tiers of the multi-tier storage system. For example, a file system operation to move files from a first tier of storage to a second tier of storage results in a snapshot of the file data being taken on the first tier of storage, and moving the file data to the second tier of storage.

An active storage 250 can receive and process file system commands for operations such as read, write, rename, delete, move, check disk quota(s), and other file system commands. An active storage 250 can include a file system manager 252, processing hardware 255, and storage unit(s) 259. Storage unit(2) 259 can be interconnected to processing hardware 255 via a network 254.

File system manger 252 can manage a large plurality of namespaces and associated data for multiple tiers of storage in storage system 200. File system manager 252 can include a user interface 251 that can be used by hosts 150 and remote administrator systems 110 to issue one or more commands to perform a file system operation. File system operations can include backup, read, write, rename, delete, move, or other file system operation. In an embodiment, a file system operation can be a tier-specific file system operation, meaning that the operation is directed to a specified tier of the multi-tier storage system 200. Tier-specific file system operation can trigger a traversal of a multi-tier namespace to identify namespace entries and data references for the tier specified in the tier-specific file system operation. File system manger 252 logic can perform the traversal of the multi-tier namespace to obtain a tier-specific copy of the multi-tier namespace and a tier-specific copy of a references to data for the specified tier. Traversal of a multi-tier namespace for storage system 200 on active storage 250 can include traversing a namespace that contains the multi-tier namespace on active storage 250.

User interface 251 of file system manager 252 can send and receive file system 200 commands containing file system 200 operations and optionally a specified tier of storage. Command format can be ASCII text, binary, encoded, encrypted, bit-mapped, or other form of command format.

Processing hardware 255 can include one or more processor(s) 256, memory 257, and networking components 258, interconnected via a network, or other hardware. Processor(s) 256 can be general purpose processor(s), arithmetic coprocessors, application specific processors, programmable logic units, or other hardware processor. Memory can include read-only memory (ROM), random access memory (RAM), flash memory, non-volatile memory such as 3DXP (3D cross-point), battery backed RAM, or other memory. Memory 257 can be programmed with, or have access to, one or more executable programs that implement file system manager 252, user interface 251, networking protocols, file and storage device protocols, device drivers, and other computing system logic. Networking 258 can include one or more network interfaces, protocol stacks, interconnections, and other networking hardware.

Active storage 250 can further include storage unit(s) 259. Storage unit(s) 259 can be interconnected with processing hardware 255 via network or bus 254 ("bus"). Bus 254 can comprise a backplane that receives an interface to storage unit(s) 259, memory 257, and networking 258.

Storage units 259 can include disk drives, flash drives, a RAID array, compact disk read-only memory (CD-ROM), digital video disk read-only memory (DVD-ROM), tape drives, battery-backed random access memory (RAM), or other storage unit type.

A representative computing device for an active storage 250 can be a computing system as described below with reference to FIG. 7.

Figure 3:
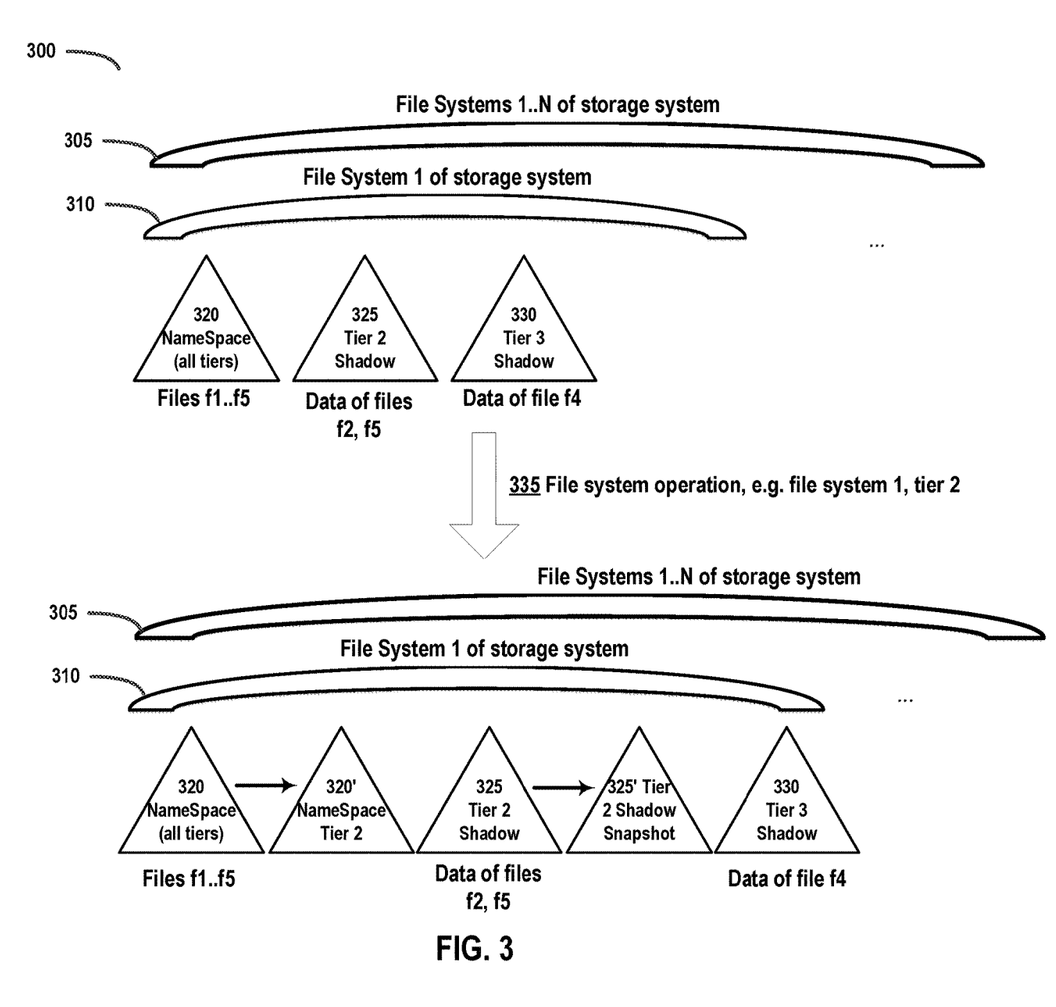
FIG. 3 illustrates, in block diagram form, data structures in a storage system that can snapshot files in a specific tier of a multi-tier storage system, in accordance with some embodiments.

FIG. 3 illustrates, in block diagram form, data structures 300 in a storage tier of a multi-tier storage system 200, e.g. active storage 250, that can snapshot files in a specific tier of a multi-tier storage system 200, and, in response to a file system operation, affect a second tier of storage in the multi-tier storage system, in accordance with some embodiments. For example, a file system operation to delete files on a first tier of storage can result in deletion of corresponding files on a second tier of storage. The delete operation on the first tier of storage results in a snapshot being taken on the first tier of storage of the file data to be deleted on the first tier of storage, and from the second tier of storage.

Storage manager 252 of, e.g., active storage 250, can manage a large plurality of file systems 305 of a multi-tier storage system 200. File systems 1..N 305 can be stored as a linked plurality of data structures, such as a b-tree, each representing a multi-tier file system 310. A multi-tier file system 310 representation can contain a linked plurality of trees, such as a namespace index 320 for all tiers, a tier 2 shadow copy 325, and a tier 3 shadow copy of tier 3 data 330. Namespace index data structure 320, for e.g. file system 1 (310), contains file and directory entries for data stored on multiple tiers of storage system 200. The multiple tiers of storage can be, e.g., active storage (e.g. Tier 1) 250, cloud storage (e.g., Tier 2) 260, and archive storage (e.g. Tier 3) 270. Each file system, e.g. file system 1 (310) can be a file system for, e.g., a user, group of users, or business entity such that each file system logically divides the namespace for the whole multi-tier storage system. Each file system 310 can also include a shadow copy 325 of references to data in, e.g. tier 2, which can be a cloud storage 260, and a shadow copy 330 of references to data in, e.g., tier 3, which can be an archive storage 270. A shadow copy of data for a tier of storage, e.g. cloud storage (Tier 2) 260, can include references to the data in the tier. References to the data can include references to inodes, mapping of files or inodes to storage logical unit numbers (LUNs), references to LUNs, references to deduplicated segments, metadata associated with any of these, including a fingerprint of a deduplicated segment, read/write permissions, create/modify dates, file owner, most recent backup, whether the backup was full or incremental, whether the data was deduplicated, and other metadata. Namespace index 320 entries can be combined to tier shadow files to access or reference data stored on tiers as files, directories, inodes, LUNS, or other organized structure. A file system 310 implemented on a storage system 200 can include more, or fewer, tiers of storage than the examples described herein.

In an example for file system 1 (310), a file system operation 335, such as move, delete, or rename files, can be received by active storage 250 file system manger 252 that specifies a file system operation on, e.g., tier 2 storage for file system 1 (310). Example namespace index 320 for file system 1 (310) contains references to five (5) files, f1..f5. Files f2 and f5 are stored on tier 2 storage and a shadow copy 325 of tier 2 data contains references to data for files f2 and 5. A shadow copy 330 of tier 3 data contains references to data for file f4. In the example, files f1 and f3 are stored on active storage 250, thus references to data of files f1 and f3 are stored with directory entries in namespace index 320 for all tiers of files system 1 (310). In response to receiving the file system operation 335 for tier 2, a namespace index 320' for tier 2 can be generated from namespace index 320 for all storage tiers in file system 1 (310).

In this example, namespace index 320' contains directory and file entries for only tier 2 files. In an embodiment, namespace index 320' contains entries for only the tier 2 files specified in the file system operation 335. Also, in this example, in response to receiving the file system operation 335, a shadow snapshot 325' of data references to tier 2 files is generated. In an embodiment, shadow snapshot 325' can be generated using tier 2 namespace index 320' and tier 2 shadow copy 325. Still referring to the above example, file system manager 252 causes execution of the tier-specific files system operation 335.

Figure 4:
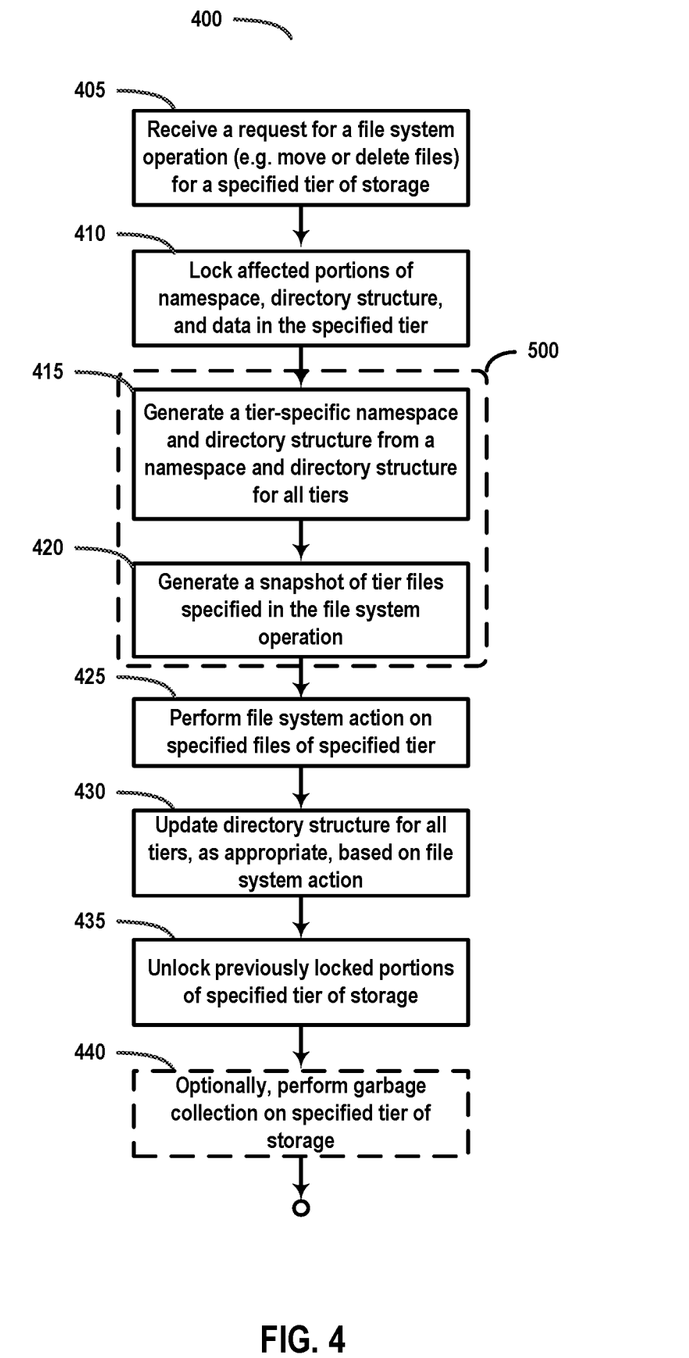
FIG. 4 illustrates, in block diagram form, a method of performing a tier-specific file system operation that results in a snapshot of data on a tier in a multi-tier storage environment, and the file system operation affects multiple tiers of the multi-tier storage, in accordance with some embodiments.

FIG. 4 illustrates, in block diagram form, a method 400 of performing a tier-specific file system operation 335 that results in a snapshot of data on a tier in a multi-tier storage system 200, and the file system operation affects multiple tiers of the multi-tier storage, in accordance with some embodiments. The file system operation results in a snapshot being taken of data on a first tier, and the file system operation affects multiple tiers of the multi-tier storage system. For example, a file system operation to move files from a first tier of storage to a second tier of storage results in a snapshot of the file data being taken on the first tier of storage, and moving the file data to the second tier of storage.

In operation 405, file system manager 252 of active storage 250 can receive a file system operation 335 (e.g. to move, rename, or delete) for a specified tier of storage in the storage system 200.

In operation 410, file system manager 252 of active storage 250 can lock portions of namespace index 320 and, as applicable, shadow tier copies 325 and/or 330, depending upon the tier(s) of storage specified in the file system operation 335. Portions of namespace index 320 and/or shadow tier copies 325 and/or 330 not implicated by file system operation 335 need not be locked.

Operations 415 and 420, described below, are further described in detail as operation 500 with respect to FIG. 5, below.

In operation 415, file system manager 252 can generate a tier-specific namespace index 320' and directory structure from a namespace index 320 that references multiple tiers of storage. For example, if the file system operation 335 is "move tier 1 files to tier 3," then a namespace index 320' for tier 1 files would be generated from namespace index 320 of all tiers.

In operation 420, file system manager 252 can generate a snapshot of tier-specific data references as specified in the tier-specific file system operation 335. For example, if the file system operation 335 is "move tier 2 files to tier 3," then a snapshot 325' of tier 2 shadow copy 325 data references can be generated. If the file system operation is "move tier 1 files to tier 3," then tier 1 data references can be stored in tier 1 namespace index 320' because tier 1 is implemented on the active storage 250.

In operation 425, file system manger 252 can cause the execution of the tier-specific file system operation 335 on the files that are implicated by the tier-specific file system operation 335. For example, referring to the FIG. 3, above, if the tier-specific command is "move tier 1 files f1 and f3 to tier 2," then file system manager 252 of active storage 250 can cause files f1 and f3 to be moved to storage tier 2, using the copy of the namespace of tier 1 and the snapshot of the data for files f1 and f3 in tier 1.

In operation 430, file system manager 252 can update the file system namespace index 320 for the tier(s) affected by the file system operation 335. For example, if the tier-specific command is "move tier 1 files f1 and f3 to tier 2, and delete f1 and f3 from tier 1 upon successful move to tier 2", then namespace index 320 (for all tiers) can be updated to add directory entries for f1 and f3 in tier 2 and to delete directory entries for files f1 and f3 from tier 1. In an embodiment, updating the file system namespace index 320 can include copying the tier-specific copy of the namespace index 320' to a target tier specified in the tier-specific file system operation 335.

In operation 435, file system manager 252 of active storage 250 can unlock previously locked portions of memory and/or storage for the specified tier(s) of storage in the file system operation 335.

In operation 440, file system manager 252 can optionally perform garbage collection on the specified tier of storage. For example, if the file system operation 335 was "move tier 1 files f1 and f3 to tier 2, and delete f1 and f3 from tier 1 upon successful move to tier 2," then storage space on tier 1 storage for data and directory entries of files f1 and f3 can be recovered for reuse. In addition, any temporary files generated as a part of performing the file system operation 335 can be deleted. For example, the temporary copy of tier 1 namespace 320' can be deleted and the space recovered for reuse.

Figure 5:
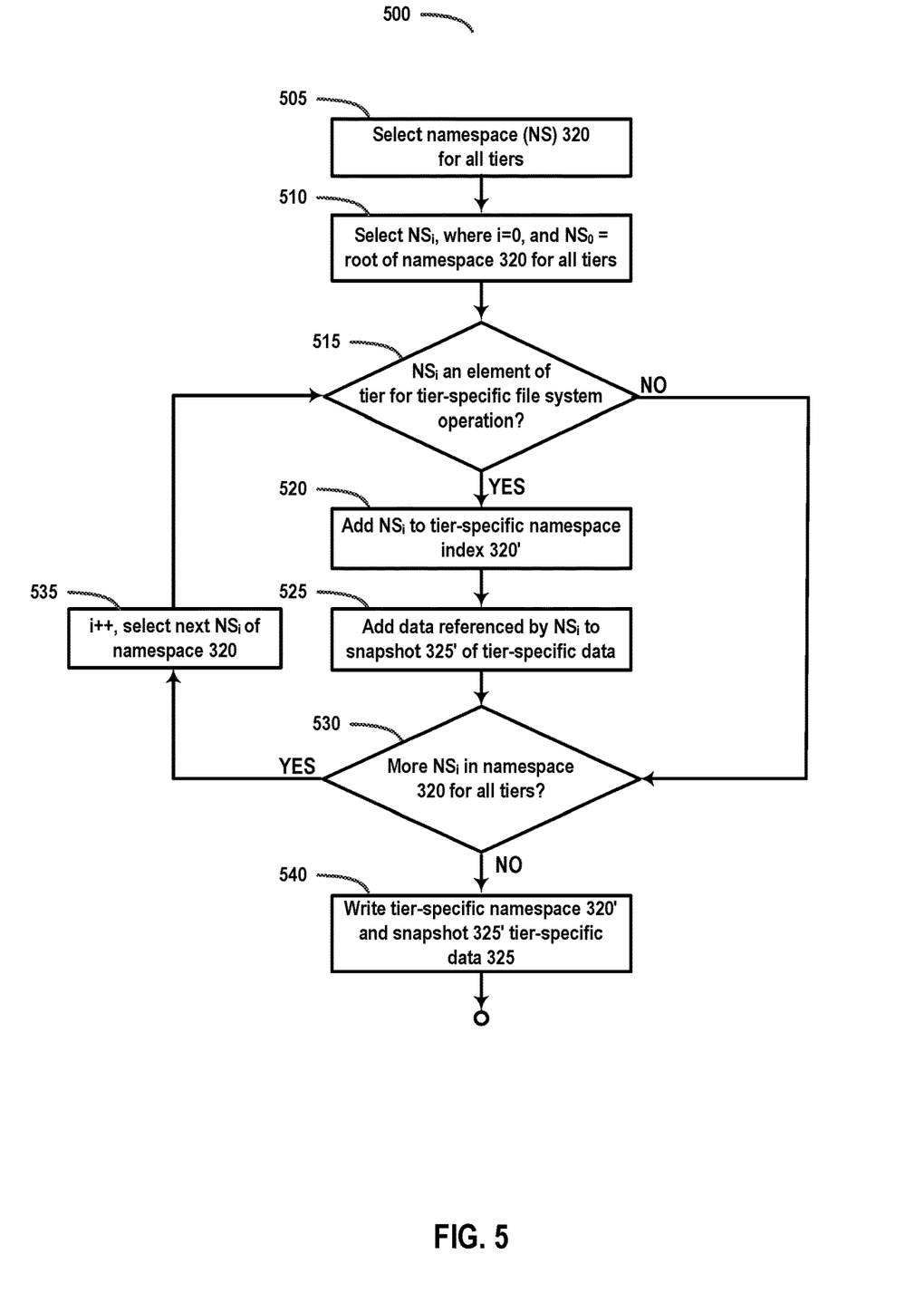
FIG. 5 illustrates, in block diagram form, a method of generating a snapshot of a namespace and a dataspace to perform a tier-specific file system operation in a multi-tier storage system, in accordance with some embodiments.

FIG. 5 illustrates, in block diagram form, a method 500 of generating a snapshot of a namespace index and a dataspace to perform a tier-specific file system operation 335 in a multi-tier storage system 200, in accordance with some embodiments. Method 500 is a more detailed description of method 400 operations 415 and 420, described above.

In operation 505, file system manager 252 of active storage 250 can select namespace index 320 for all tiers of storage in storage system 200 for a particular user or business entity. In an embodiment, file system manager 252 may lock a portion of namespace index 320 implicated by tier-specific file system operation 335.

In operation 510, file system manager 252 can select a first namespace entry, $NS_0$, where i=0. In an embodiment, $NS_0$, can be a root namespace index entry in the namespace index 320 for all tiers of storage.

In operation 515, it can be decided whether namespace index 320 entry $NS_i$, references a namespace entry for the tier of storage specified in the tier-specific file system operation 335. If so, then method 500 continues at operation 520, otherwise method 500 continues at operation 530.

In operation 520, file system manager 252 can add namespace index 320 entry $NS_i$, to a tier-specific namespace index 320' for the tier-specific file system operation 335. File system manager 252 can also add any metadata associated with the namespace index 320 entry $NS_i$ to the tier-specific namespace index 320'.

In operation 525, file system manager 252 can add data referenced by namespace index 320 entry $NS_i$, to a tier-specific data snapshot for the tier-specific file system operation 335. File system manager 252 can also add any metadata associated with the data for the namespace index 320 entry $NS_i$, to the tier-specific data snapshot for the tier-specific file system operation 335 associated with the for the namespace index 320 entry $NS_i$. If the tier referenced in the tier-specific file system operation 335 is for the active storage 250 (tier 1), then the data references (e.g. parent and data inodes, or LUNs) may be contained within the namespace index 320 entry $NS_i$, and need not be added to a separate snapshot copy of tier-specific data. If tier-specific file system operation 335 is for tier 2 or 3 (or another tier, other than tier 1), then one or more data references to tier-specific data can be added to a tier-specific snapshot, e.g. 325' or 330', from the associated tier data shadow copy, e.g. 325 or 330.

In operation 530, it can be determined whether there are more namespace index entries, $NS_i$, in the namespace index 320 for the multiple tiers of storage. If so, then method 500 continues at operation 535, otherwise method 500 continues at operation 540.

In operation 535, namespace index 320 variable, i, can be incremented and method 500 continues at operation 515 to process the next namespace index 320 entry, $NS_i$.

In operation 540, file system manager 252 can cause the tier-specific namespace 320' to be stored in preparation for performing the tier-specific file system operation 335. File system manager 252 can also cause the tier-specific data snapshot 325' or 330' to be stored in preparation for the tier-specific file system operation 335. In an embodiment wherein the tier-specific file system operation 335 is for the active tier (tier 1), a separate tier-specific data snapshot need not be generated because the data referenced by the tier-specific namespace index 320' is referenced within tier-specific namespace index 320'.

Figure 6:
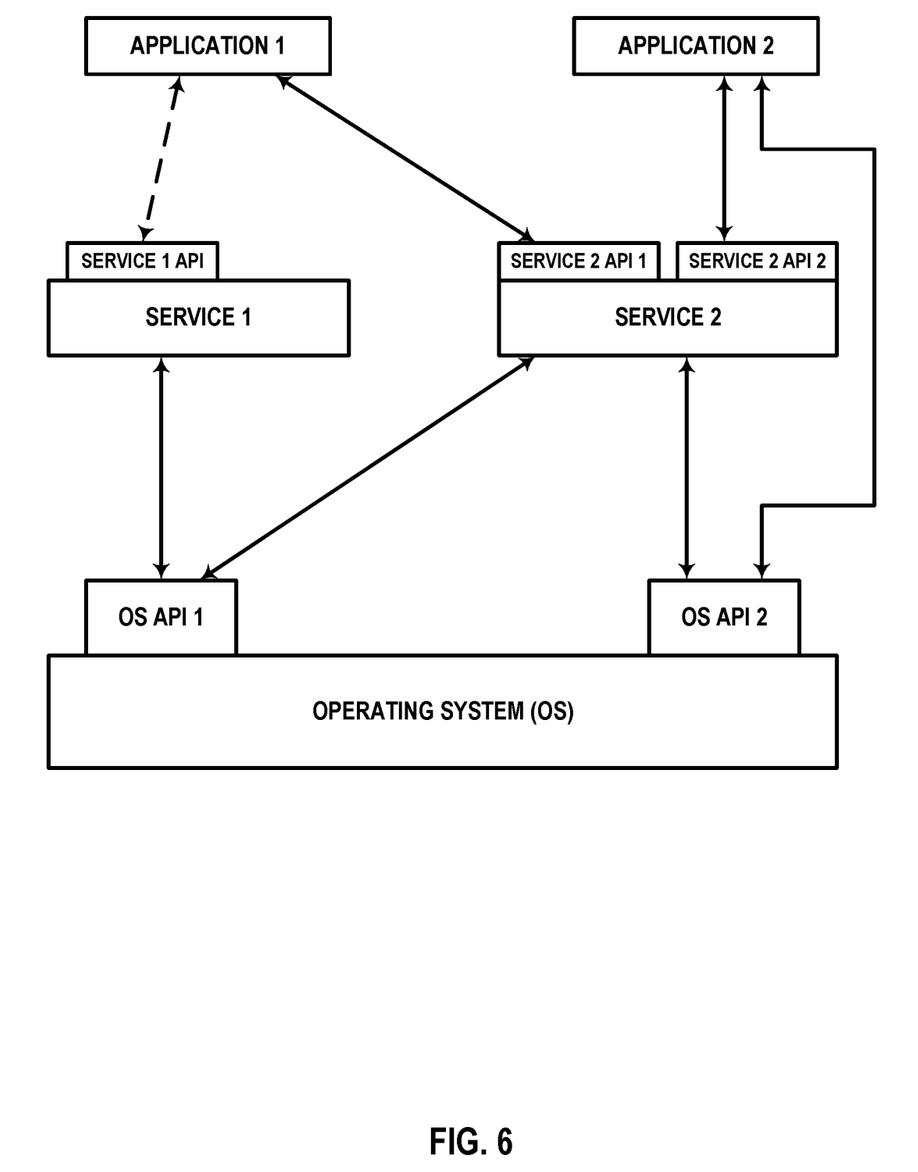
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 7:
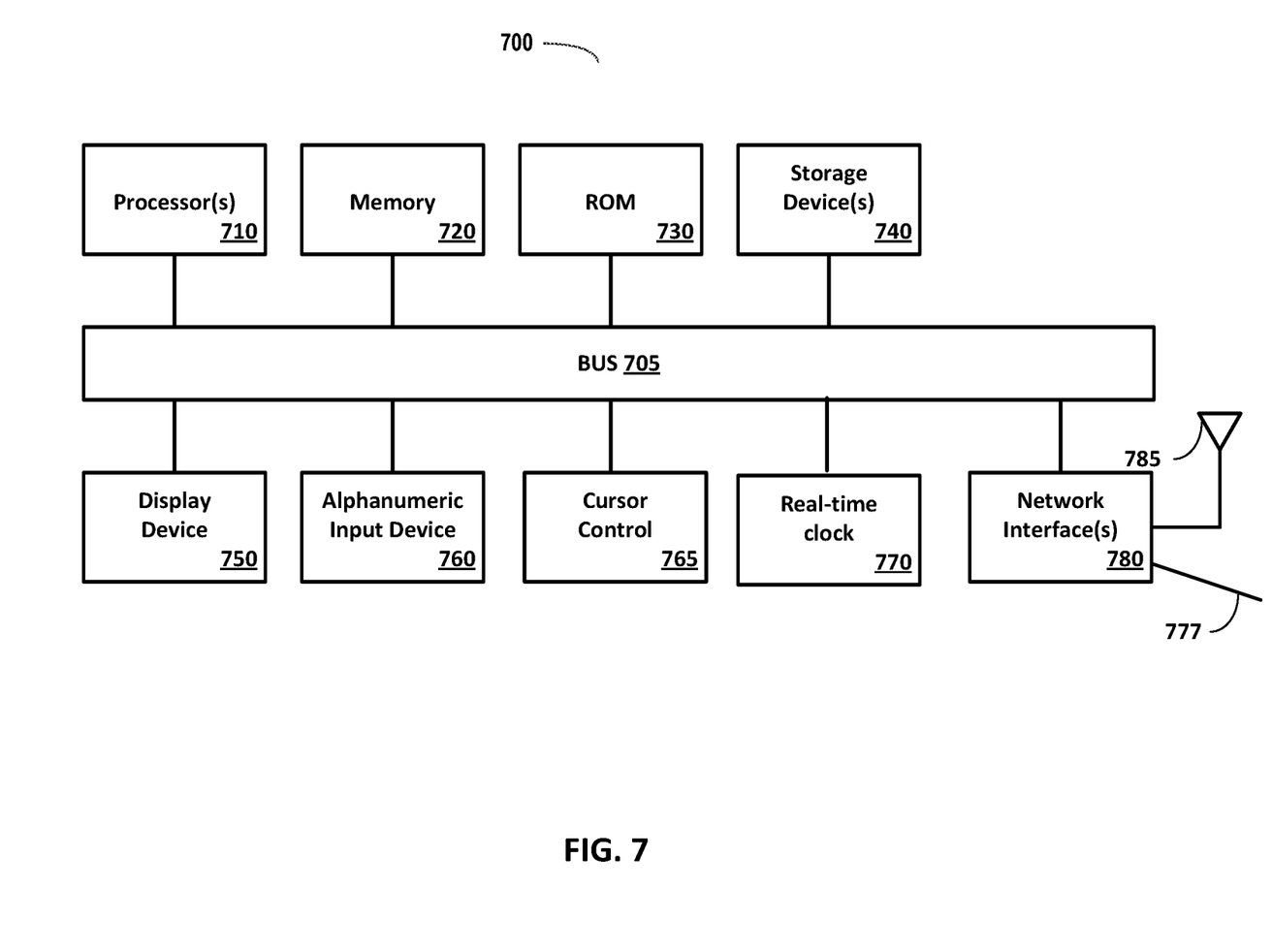
FIG. 7 illustrates, in block diagram form, an exemplary computing system for implementing concepts described herein.

FIG. 7 is a block diagram of one embodiment of a computing system 700. The computing system illustrated in FIG. 7 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide a computing device and/or a server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) 730 and/or other static, non-transitory storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a light-emitting diode display (LED), liquid crystal display (LCD), or touch screen display to display information to a user. Computing system 700 can also include an alphanumeric input device 760, including alphanumeric and other keys, which may be coupled to bus 705 to communicate information and command selections to processor(s) 710. Another type of user input device is cursor control 765, such as a touchpad, a mouse, a trackball, or cursor direction keys to communicate direction information and command selections to processor(s) 710 and to control cursor movement on display 750. Computing system 700 may further include a real-time clock 770. The real-time clock 770 may be used for generating date/time stamps for data records, computing elapsed time, and other time-keeping functions. A real-time clock 770 can be a battery-backed chipset with a settable date and time. Alternatively, a real-time clock 770 may include logic to retrieve a real-time from a network source such as a server or an Internet server via network interfaces 780, described below.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
receiving, by a file system storage device that comprises a namespace that spans multiple file system tiers, a request to perform a tier-specific file system operation that affects a plurality of file system tiers;
in response to receiving the request:
generating from the namespace that spans multiple file system tiers a tier-specific namespace that corresponds to the tier-specific file system operation and contains directory and file entries only for a tier specified in the tier-specific file system operation;
generating, using the tier-specific namespace, a tier-specific snapshot of data associated with the tier-specific namespace; and
executing the tier-specific file system operation;
wherein generating the tier-specific namespace comprises:
traversing the namespace that spans multiple tiers to identify namespace entries that are associated with the specified tier and the specified file system operation;
adding the identified namespace entries to the tier-specific namespace;
and wherein generating the tier-specific data comprises using the tier-specific namespace entries to identify, and adding to the tier-specific snapshot, tier-specific data associated with the tier-specific file system operation.

2. The method of claim 1, wherein a storage tier of the multiple file system tiers comprises one of: active storage, cloud storage, and archive storage.

3. The method of claim 1, wherein the file system operation comprises one of:
performing a tier-specific file system deletion of files, or moving data from a first storage tier to a second storage tier, and the storage tier specified in the tier-specific file system operation comprises the first tier of storage.

4. The method of claim 1, practiced on a storage device that comprises an active storage tier.

5. The method of claim 4, wherein the storage tier specified in the tier-specific file operation is other than the active storage tier.

6. The method of claim 1, further comprising:
prior to performing the file system operation, locking a portion of the namespace that spans multiple tiers, the locked portion corresponding to at least a portion of the tier-specific namespace.

7. A non-transitory computer-readable medium programmed with executable instructions that, when executed by a processing system having at least one hardware processor, perform operations comprising:
receiving, by a file system storage device that comprises a namespace that spans multiple file system tiers, a request to perform a tier-specific file system operation that affects a plurality of file system tiers;
in response to receiving the request:
generating from the namespace that spans multiple file system tiers a tier-specific namespace that corresponds to the tier-specific file system operation and contains directory and file entries only for a tier specified in the tier-specific file system operation;
generating, using the tier-specific namespace, a tier-specific snapshot of data associated with the tier-specific namespace; and
executing the tier-specific file system operation;
wherein generating the tier-specific namespace comprises:
traversing the namespace that spans multiple tiers to identify namespace entries that are associated with the specified tier and the specified file system operation;
adding the identified namespace entries to the tier-specific namespace;
and wherein generating the tier-specific data comprises using the tier-specific namespace entries to identify, and adding to the tier-specific snapshot, tier-specific data associated with the tier-specific file system operation.

8. The medium of claim 7, wherein a storage tier of the multiple file system tiers comprises one of: active storage, cloud storage, and archive storage.

9. The medium of claim 7, wherein the file system operation comprises one of:
performing a tier-specific file system deletion of files, or moving data from a first storage tier to a second storage tier, and the tier specified in the tier-specific file system operation comprises the first tier of storage.

10. The medium of claim 7, wherein the operations are practiced on a storage device that comprises an active storage tier.

11. The medium of claim 10, wherein the storage tier specified in the tier-specific file operation is other than the active storage tier.

12. The medium of claim 7, the operations further comprising:
prior to performing the file system operation, locking a portion of the namespace that spans multiple tiers, the locked portion corresponding to at least a portion of the tier-specific namespace.

13. A system comprising:
a processing system having at least one hardware processor, the processing system coupled to a memory programmed with executable instructions that, when executed by the processing system, perform operations comprising:
receiving, by a file system storage device that comprises a namespace that spans multiple file system tiers, a request to perform a tier-specific file system operation that affects a plurality of file system tiers;
in response to receiving the request:
generating from the namespace that spans multiple file system tiers a tier-specific namespace that corresponds to the tier-specific file system operation and contains directory and file entries only for a tier specified in the tier-specific file system operation;
generating, using the tier-specific namespace, a tier-specific snapshot of data associated with the tier-specific namespace; and
executing the tier-specific file system operation,
wherein generating the tier-specific namespace comprises:
traversing the namespace that spans multiple tiers to identify namespace entries that are associated with the specified tier and the specified file system operation;
adding the identified namespace entries to the tier-specific namespace;
and wherein generating the tier-specific data comprises using the tier-specific namespace entries to identify, and adding to the tier-specific snapshot, tier-specific data associated with the tier-specific file system operation.

14. The system of claim 13, wherein a storage tier of the multiple file system tiers comprises one of: active storage, cloud storage, and archive storage.

15. The system of claim 13, wherein the file system operation comprises one of:
    performing a tier-specific file system deletion of files, or moving data from a first storage tier to a second storage tier, and the tier specified in the tier-specific file system operation comprises the first tier of storage.

16. The system of claim 13, wherein the operations are practiced on a storage device that comprises an active storage tier.

17. The system of claim 16, wherein the storage tier specified in the tier-specific file operation is other than the active storage tier.

18. The system of claim 13, the operations further comprising:
    prior to performing the file system operation, locking a portion of the namespace that spans multiple tiers, the locked portion corresponding to at least a portion of the tier-specific namespace.

\* \* \* \* \*